United States Patent
Ogasawara

(10) Patent No.: US 9,637,563 B2
(45) Date of Patent: *May 2, 2017

(54) SURFACTANT COMPOSITION

(71) Applicant: DAI-ICHI KOGYO SEIYAKU CO., LTD., Kyoto-shi, Kyoto (JP)

(72) Inventor: Asako Ogasawara, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/899,766

(22) PCT Filed: Jun. 19, 2014

(86) PCT No.: PCT/JP2014/066270
§ 371 (c)(1),
(2) Date: Dec. 18, 2015

(87) PCT Pub. No.: WO2015/001968
PCT Pub. Date: Jan. 8, 2015

(65) Prior Publication Data
US 2016/0137755 A1    May 19, 2016

(30) Foreign Application Priority Data

Jul. 3, 2013  (JP) ................................ 2013-139985

(51) Int. Cl.
| C08F 2/24 | (2006.01) |
| BO1F 17/00 | (2006.01) |
| C08F 2/20 | (2006.01) |
| C08F 2/30 | (2006.01) |
| C08L 71/00 | (2006.01) |

(52) U.S. Cl.
CPC ............ C08F 2/24 (2013.01); B01F 17/0021 (2013.01); B01F 17/0057 (2013.01); B01F 17/0064 (2013.01); B01F 17/0085 (2013.01); C08F 2/20 (2013.01); C08F 2/30 (2013.01); C08L 71/00 (2013.01)

(58) Field of Classification Search
CPC ......................................... C08F 2/24
See application file for complete search history.

(56) References Cited

U.S. PATENT DOCUMENTS

| 5,324,862 A | 6/1994 | Yokota et al. | |
| 6,303,834 B1 * | 10/2001 | Mork | ..................... A61L 15/425 |
| | | | 568/614 |

FOREIGN PATENT DOCUMENTS

| JP | 63-183998 | | 7/1988 |
| JP | 63-319035 | | 12/1988 |
| JP | 4-50204 | | 2/1992 |
| JP | 06248005 A | * | 9/1994 |

OTHER PUBLICATIONS

English machine translation of JP 06248005 A (1994).*
International Search Report issued Sep. 22, 2014 in corresponding International Application No. PCT/JP2014/062270.

* cited by examiner

Primary Examiner — Peter F Godenschwager
(74) Attorney, Agent, or Firm — Wenderoth, Lind & Ponack, L.L.P.

(57) ABSTRACT

A reactive surfactant composition comprising one or more kinds of reactive surfactants is disclosed that may be used as an emulsifier for emulsion polymerization, a dispersant for suspension polymerization, a nonaqueous dispersant, or a resin modifier.

10 Claims, No Drawings

SURFACTANT COMPOSITION

TECHNICAL FIELD

The present invention relates to a surfactant composition containing a reactive surfactant having a radically polymerizable group, and its use.

BACKGROUND ART

Surfactants have wide performances such as emulsification, dispersion, cleaning, wetting and foaming. By utilizing those performances, they are conventionally used in preparing products such as paints, printing inks and adhesives, and are contained in products as components that are indispensable in stabilization of products, workability and the like. Particularly, in recent years, a movement toward high performance of end products using a surfactant is becoming active. Accordingly, deterioration of performances such as water resistance of coating films, printing surfaces, adhesive coatings, and the like due to surfactants is pointed out.

As an emulsifier for emulsion polymerization, for example, use has been made conventionally of anionic surfactants such as soaps, sodium dodecylbenzene sulfonate, a polyoxyethylene alkyl phenyl ether sulfuric ester salt and a polyoxyethylene alkyl ether sulfuric ester salt; and nonionic surfactants such as polyoxyethylene nonyl phenyl ether and a polyoxyethylene alkyl ether are utilized. However, in polymer films obtained from polymer dispersions using those emulsifiers, the emulsifiers used remain in the polymer films in a free state, and therefore there is a problem that water resistance and adhesiveness of films are deteriorated. Furthermore, even in polymers produced by suspension polymerization, the similar phenomenon due to a dispersant for suspension polymerization is pointed out. Therefore, many reactive surfactants having a copolymerizable unsaturated group have been proposed as an improvement measure against the above problems (for example, Patent Documents 1 to 3).

However, reactive emulsifiers having an acryl group or methacryl group as a copolymerizable unsaturated group that are proposed in the conventional arts have excellent copolymerizability with a monomer, but have a problem that polymerization stability during emulsion polymerization is deteriorated. For example, there are problems such that the amount of aggregates during emulsion polymerization is large, particles formed are coarse and stability with time is poor. Reactive emulsifiers having an allyl group as a copolymerizable unsaturated group sometimes have poor copolymerizability between the reactive emulsifiers and monomers depending on monomer species and polymerization conditions, and a polymer film obtained by a polymer dispersion remains the problem that one capable of sufficiently satisfying water resistance and adhesiveness cannot be obtained and the problem that process trouble is caused from foaming of the polymer dispersion. Particularly the above problems frequently occur in the case of containing styrene as a monomer in emulsion polymerization, and improvement of those problems are strongly demanded in commercial production.

PRIOR ART DOCUMENTS

Patent Document

Patent Document 1: JP-A-63-183998
Patent Document 2: JP-A-63-319035
Patent Document 3: JP-A-04-050204

SUMMARY OF THE INVENTION

Problems that the Invention is to Solve

The present invention has been made in view of the actual circumstances, and an object thereof is to provide a reactive surfactant composition that suppresses foaming of an emulsion material and a dispersion material, has a high polymerization stability, for example, in the case of using as an emulsifier for emulsion polymerization, and can further improve various characteristics such as water resistance of coating films, printing surfaces, adhesive coatings, and the like.

Means for Solving the Problems

A reactive surfactant composition of the present invention contains one kind or two or more kinds of reactive surfactants (X) represented by a following general formula (I) and one kind or two or more kinds of polyfunctional compounds (Y) represented by a following general formula (II).

[Chem. 1]

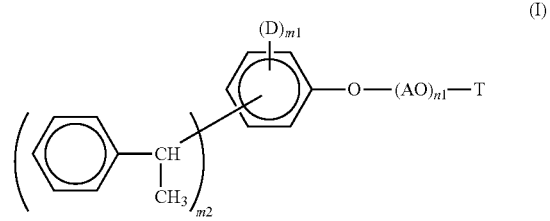

(I)

[Chem. 2]

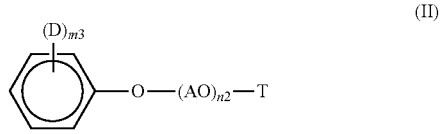

(II)

In the general formula (I) and the general formula (II), D represents a polymerizable unsaturated group represented by either of following chemical formulae D-1 and D-2 in which $R^1$ represents a hydrogen atom or a methyl group; A represents an alkylene group or a substituted alkylene group having from 2 to 4 carbon atoms, n1 and n2 each represents an addition mole number in a range of from 0 to 1,000; T represents a hydrogen atom or an anionic hydrophilic group selected from $-(CH_2)_a-SO_3M$, $-(CH_2)_b-COOM$, $-PO_3M_2$, $-P(U)O_2M$, and $-CO-CH_2-CH(SO_3M)-COOM$, in which a and b each represents a number of from 0 to 4, U represents a residue in which T is eliminated from the general formula (I) or general formula (II), and M independently represents a hydrogen atom, an alkali metal atom, an alkali earth metal atom, an ammonium residue, or an alkanol amine residue; in the general formula (I), m1 represents a number of substituents in a range of from 1 to 2, and m2 represents a number of substituents in a range of from 1 to 3; and in the general formula (II), m3 represents a number of substituents in a range of from 2 to 3.

[Chem. 3]

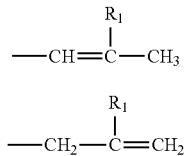

In the surfactant composition of the present invention, it is preferable that a value of (D-1)/(D-2) is larger than 2, which is a molar ratio between the polymerizable unsaturated group represented by the chemical formula D-1 and the polymerizable unsaturated group represented by the chemical formula D-2 that are contained in the reactive surfactant (X) represented by the general formula (I) and the polyfunctional compound (Y) represented by the general formula (II).

It is more preferable that a value of (D-1)/(D-2) is larger than 2, which is a molar ratio between the polymerizable unsaturated group represented by the chemical formula D-1 and the polymerizable unsaturated group represented by the chemical formula D-2 that are contained in the reactive surfactant (X) represented by the general formula (I), and a value of (D-1)/(D-2) is larger than 2, which is a molar ratio between the polymerizable unsaturated group represented by the chemical formula D-1 and the polymerizable unsaturated group represented by the chemical formula D-2 that are contained in the polyfunctional compound (Y) represented by the general formula (II).

Preferably used is one in which a ratio (Y/X) of a total amount of the polyfunctional compound (Y) used to a total amount of the reactive surfactant (X) used falls within a range of Y/X=1/1 to 1/100 in mass ratio.

The surfactant composition of the present invention can be preferably used as, for example, an emulsifier for emulsion polymerization, a dispersant for suspension polymerization, a nonaqueous dispersant, or a resin modifier.

Advantageous Effects of the Invention

According to the present invention, there can be provided a surfactant composition that can suppress foaming of an emulsion material and a dispersion material due to a surfactant and additionally can remarkably improve various characteristics such as water resistance of coating films, printing surfaces, adhesive coatings and the like, and as a result, can be preferably used in an emulsifier for emulsion polymerization, a dispersant for suspension polymerization, a nonaqueous dispersant, a resin modifier and the like.

MODE FOR CARRYING OUT THE INVENTION

The best mode for carrying out the present invention is described below.

[Reactive Surfactant (X)]

The reactive surfactant (X) used in the present invention is represented by the following general formula (I). In the formula (I), D represents a polymerizable unsaturated group represented by either of the following chemical formulae D-1 and D-2. In these formulae, $R^1$ represents a hydrogen atom or a methyl group.

[Chem. 4]

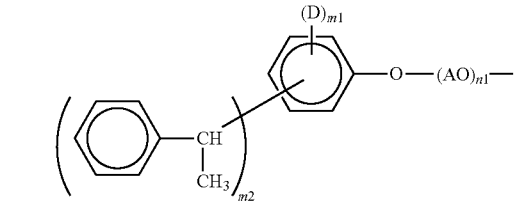

[Chem. 5]

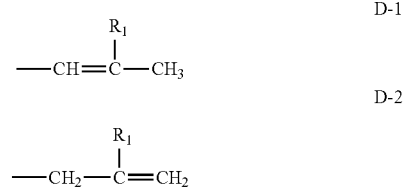

$R^1$ in the chemical formulae D-1 and D-2 represents a hydrogen atom or a methyl group. Therefore, D specifically represents a 1-propenyl group, a 2-methyl-1-propenyl group or a (meth)allyl group. As D, any one of those 1-propenyl group, 2-methyl-1-propenyl group and (meth)allyl group may be present alone, and those may be present as a mixture. Preferred is a 1-propenyl group.

The number m1 of substituents in the group D represented by the chemical formula D-1 and the chemical formula D-2 is preferably in a range of from 1 to 2 in average value. When m1 indicating the number of substituents of D is 1, it is preferred that the substitution position of D is an ortho-position ($2^{nd}$-position or $6^{th}$-position), and when m1 indicating the number of substituents of D is 2, it is preferred that the substitution positions of D's are an ortho-position and a para-position ($2^{nd}$-position or $6^{th}$-position, and $4^{th}$-position). Additionally, it is preferred that the value of (D-1)/(D-2) that is a molar ratio of the group represented by the chemical formula D-1 to the group represented by the chemical formula D-2 is larger than 2.

The number m2 of substituents is preferably in a range of from 1 to 3, and more preferably in a range of from 1 to 2, in average value.

The $(AO)_{n1}$ chain moiety in the general formula (I) is one kind or two or more kinds of addition polymers of ethylene oxide, propylene oxide, butylene oxide, and tetrahydrofuran (1,4-butylene oxide), as alkylene oxide having from 2 to 4 carbon atoms. Polymerization form is not particularly limited, and may be any of a homopolymer of one kind of alkylene oxide, and a random copolymer, a block copolymer and a combination of those random adduct and block copolymer of two or more kinds of alkylene oxides.

As the alkylene oxide, an oxyethylene group is particularly preferable. In the case of selecting two or more kinds of alkylene oxides, it is preferred that ethylene oxide is selected as one kind, and that the $(AO)_{n1}$ chain moiety is a (poly)oxyalkylene chain containing an oxyethylene group in an amount of preferably from 50 to 100 mol %, and more preferably from 70 to 100 mol %.

n1 represents the addition mole number of alkylene oxide, and is the number in a range of from 0 to 1,000 and preferably the number in a range of from 0 to 100, in average value. In more detail, when X in the general formula (I) is a hydrogen atom, it is preferred that the addition mole number n1 is the number in a range of from 10 to 50. When T is an anionic hydrophilic group, the addition mole number n1 is preferably the number in a range of from 0 to 50, and more preferably the number in a range of from 3 to 30.

In the reactive surfactant (X) represented by the general formula (I), the content of the oxyalkylene group in the $(AO)_{n1}$ chain and the addition mole number n1 make the degree of hydrophilicity or hydrophobicity of the surfactant be variable. For example, in the case of using as an emulsifier for emulsion polymerization, it is preferred that the composition of the $(AO)_{n1}$ chain moiety is appropriately designed according to characteristics of a polymer dispersion and characteristics of a polymer film to be targeted, or according to monomers used and use applications.

T in the general formula (I) is a hydrogen atom, an anionic hydrophilic group represented by —$(CH_2)_a$—$SO_3M$, —$(CH_2)_b$—COOM, —$PO_3M_2$, —$P(U)O_2M$, or —CO—$CH_2$—$CH(SO_3M)$-COOM (in the formulae, a and b each represents the number of from 0 to 4, and U represents a residue in which T is eliminated from the general formula (I)), or the like. In the formulae representing the anionic hydrophilic groups, M represents a hydrogen atom, an alkali metal atom such as lithium, sodium or potassium, an alkali earth metal atom such as magnesium or calcium, an ammonium, or an alkanol amine residue. Examples of the ammonium include ammonium of ammonia, and ammonium of an alkyl amine such as monomethylamine or dipropylamine. Examples of the alkanol amine residue include a monoethanol amine residue, a diethanol amine reside and a triethanol amine residue. Of those anionic hydrophilic groups, a group represented by —$SO_3M$, —$PO_3M_2$ or —$P(U)O_2M$ is preferred. The —$PO_3M_2$ represents a monoester with the residue U in which T is eliminated from the general formula (I), and —$P(U)O_2M$ represents a diester with the residue U in which T is eliminated from the general formula (I). Those can be each used in a single component in the present invention and can be used as a mixture in the present invention, as described above.

Series of processes of a production method of the reactive surfactant of the present invention are described in detail below. A method for obtaining a phenol derivative having a polymerizable group in an aromatic ring, which is an intermediate of the reactive surfactant of the present invention, includes a method for obtaining a phenol derivative having a polymerizable group in an aromatic ring including reacting phenol with halogenated allyl according to a conventional manner, and then performing Claisen rearrangement in the presence of an alkali. Subsequently, this is used as an intermediate and thereto is performed an addition of alkylene oxide. A target nonionic reactive surfactant can be thereby obtained. Furthermore, an anionic hydrophilic group is introduced in the nonionic compound according to a conventional manner. A target reactive surfactant having the anionic hydrophilic group can be thereby obtained. The synthetic route in the present invention is not particularly limited, and methods other than the above can be utilized. Series of reaction processes are described below.

In the general formula (I), the polymerizable unsaturated group represented by D is a 1-propenyl group, a 2-methyl-1-propenyl group or a (meth)allyl group as described above. Of those, the (meth)allyl group is introduced by a (meth)allylation reaction of phenol. On the other hand, the 1-propenyl group or the 2-methyl-1-propenyl group can be introduced by performing a (meth)allylation of styrenated phenol, and then rearranging into the 1-propenyl group or the 2-methyl-1-propenyl group in the presence of an alkali. The following method is exemplified as 1-propenyl group introduction to styrenated phenol, but the present invention is not limited to this synthesis method.

That is, a halogenated allyl is reacted with a styrenated phenol together with a basic substance such as sodium hydroxide or potassium hydroxide, followed by heating to about 100° C., thereby obtaining styrenated allylphenol. At this stage, by controlling the amounts of the halogenated allyl and basic substance, 2-substitution product of styrenated phenol by the allyl group can be obtained. This reaction is described in more detail below showing general formulae. Styrenated diallylphenol is first obtained according to the following reaction formulae (i) to (iv).

[Chem. 6]

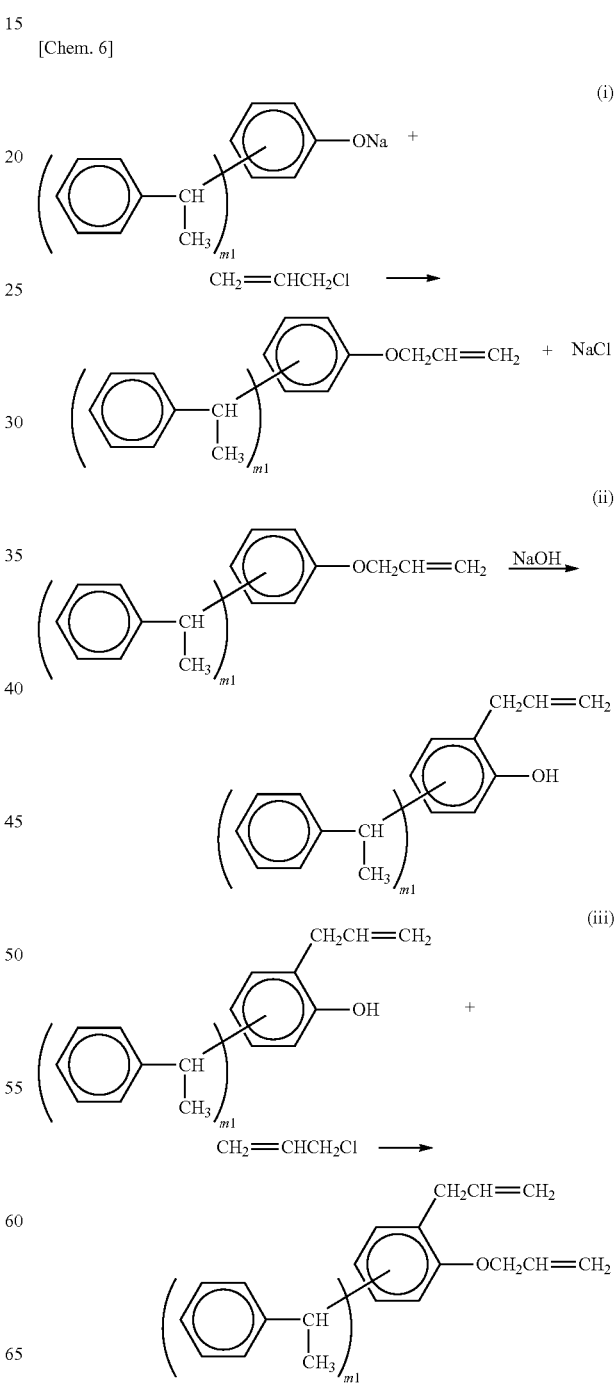

(iv)

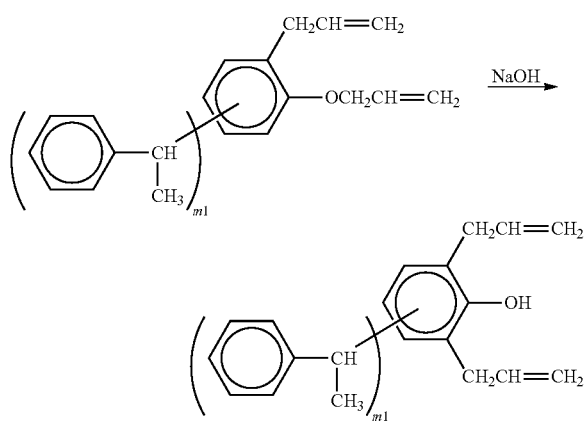

A reaction composition containing a diallyl can be obtained by the reactions shown by the reaction formulae (i) to (iv). By heating those reaction compositions in the presence of an alkali hydroxide, an allyl group rearranges into 1-propenyl group, and styrenated propenylphenol as a main target product is obtained. Depending on reaction conditions, a composition containing a certain amount of unrearranged styrenated allylphenol can be obtained.

The subsequent steps are described below by reference to styrenated diallylphenol obtained by the reaction formula (iv). By adding a given amount of an alkylene oxide to the obtained styrenated diallylphenol according to a conventional method, a nonionic reactive surfactant of the present invention is obtained, which is one of the target products, in which, in the general formula (I), D is 1-propenyl group, the number of substituents of a polymerizable unsaturated group represented by D is 2 and T is a hydrogen atom as described above.

When T in the general formula (I) is an anionic hydrophilic group, the compound obtained by the above method is further subjected to an introduction method of an anionic hydrophilic group. There is no limitation in reaction conditions for introducing an anionic hydrophilic group in which a in $-(CH_2)_a-SO_3M$ is indicated by 0 among the formulae representing anionic hydrophilic groups, and the production can be performed, for example, by a reaction with sulfamic acid, sulfuric acid, sulfuric anhydride, fuming sulfuric acid, chlorosulfonic acid or the like. Reaction conditions for introducing an anionic hydrophilic group in which a in $-(CH_2)_a-SO_3M$ is indicated by the number of from 1 to 4 are not particularly limited, and the production can be performed, for example, by a reaction with propane sultone, butane sultone or the like.

Reaction conditions for introducing an anionic hydrophilic group represented by $-(CH_2)_b-COOM$ among the formulae representing anionic hydrophilic groups are also not particularly limited, and the production can be performed by, for example, oxidizing a hydroxyl group or conducting a carboxylation by a reaction with a monohalogenated acetic acid, or performing a reaction with acrylonitrile or an acrylic acid ester and conducting a saponification with an alkali.

There is also no limitation in reaction conditions for introducing an anionic hydrophilic group represented by $-PO_3M_2$ and/or $-P(U)O_2M$ (in the formula, U represents a residue in which T is eliminated from the general formula (I)) among the formulae representing anionic hydrophilic groups, and the production can be performed, for example, by a reaction with diphosphorus pentoxide, polyphosphoric acid, orthophosphoric acid, phosphorus oxychloride, or the like. In the case where a phosphoric acid ester group is the anionic hydrophilic group, a monoester type compound and a diester type compound are obtained as a mixture thereof depending on the production method. Those may be separated, and may be directly used as a mixture. Furthermore, those can be used after a reaction in the presence of water to increase the proportion of the monoester compound contained.

Reaction conditions for introducing an anionic hydrophilic group represented by $-CO-CH_2-CH(SO_3M)-COOM$ among the formulae representing anionic hydrophilic groups are also not particularly limited, and the production can be performed, for example, by conducting a monoesterification by a reaction with maleic anhydride, followed by conducting a sulfonation by a reaction with anhydrous sodium sulfite. In the case where anionic hydrophilization has been conducted, neutralization may be thereafter conducted with an alkali such as sodium hydroxide or potassium hydroxide, ammonia, an alkyl amine, an alkanol amine such as monoethanol amine or diethanol amine, or the like.

T in the reactive surfactant (X) may be a hydrogen atom (in this case, X is nonionic), may be one kind or two or more kinds of anionic hydrophilic groups (in this case, X is anionic), and may be a mixture of those.

The reactive surfactant (X) may be a commercially available product and may be a trial product so long as it satisfies the requirements limited in the present invention.

[Polyfunctional Compound (Y)]

The polyfunctional compound (Y) used in the present invention is represented by the following general formula (II). In the formula (II), D represents a polymerizable unsaturated group represented by either of the following chemical formulae D-1 and D-2. In these formulae, $R^1$ represents a hydrogen atom or a methyl group.

[Chem. 7]

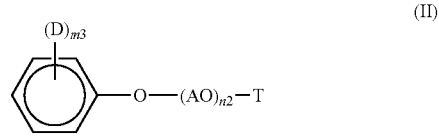

(II)

[Chem. 8]

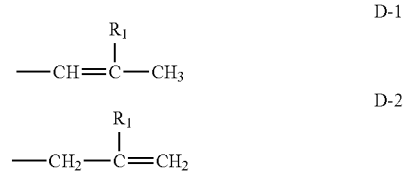

$R^1$ in the chemical formulae D-1 and D-2 represents a hydrogen atom or a methyl group. Therefore, D specifically represents a 1-propenyl group, a 2-methyl-1-propenyl group or a (meth)allyl group. As D, any one of those 1-propenyl group, 2-methyl-1-propenyl group and (meth)allyl group may be present alone, and those may be present as a mixture. Preferred is a 1-propenyl group. The number m3 of the group D represented by the chemical formula D-1 and the chemical formula D-2 is preferably in a range of from 2 to 3 in average value. When m3 indicating the number of substituents of D is 2, it is preferred that the substitution position of D is an ortho-position ($2^{nd}$-position and $6^{th}$-position), and when m3 indicating the number of substituents of D is 3, it is preferred that the substitution positions of D's are an ortho-position and a para-position ($2^{nd}$-position, $4^{th}$-position and $6^{th}$-position). In the groups each represented by the chemical formula D-1 and the chemical formula D-2, it is preferred that a value of (D-1)/(D-2) as a molar ratio of those is larger than 2.

The $(AO)_{n2}$ chain moiety in the general formula (II) is one kind or two or more kinds of addition polymers of ethylene oxide, propylene oxide, butylene oxide, and tetrahydrofuran (1,4-butylene oxide), as alkylene oxide having from 2 to 4 carbon atoms. Polymerization form is not particularly limited, and may be any of a homopolymer of one kind of alkylene oxide, and a random copolymer, a block copolymer and a combination of those random adduct and block copolymer of two or more kinds of alkylene oxides.

As the alkylene oxide, an oxyethylene group is particularly preferable. In the case of selecting two or more kinds of alkylene oxides, it is preferred that ethylene oxide is selected as one kind, and that the $(AO)_{n2}$ chain moiety is a (poly)oxyalkylene chain containing an oxyethylene group in an amount of preferably from 50 to 100 mol %, and more preferably from 70 to 100 mol %.

n2 represents the addition mole number of alkylene oxide, and is the number in a range of from 0 to 1,000 and preferably the number in a range of from 0 to 100, in average value. In more detail, when X in the general formula (I) is a hydrogen atom, it is preferred that the addition mole number n2 is the number in a range of from 10 to 50. When T is an anionic hydrophilic group, the addition mole number n2 is preferably the number in a range of from 0 to 50, and more preferably the number in a range of from 3 to 30.

In the polyfunctional compound (Y) represented by the general formula (II), the content of the oxyethylene group in the $(AO)_{n2}$ chain and the addition mole number n2 make the degree of hydrophilicity or hydrophobicity of the emulsifier be variable. In the case of using as an emulsifier for emulsion polymerization, it is preferred that the composition of the $(AO)_{n2}$ chain moiety is appropriately designed according to characteristics of a polymer dispersion and characteristics of a polymer film to be targeted, or according to monomers used and use applications.

T in the general formula (II) is a hydrogen atom, an anionic hydrophilic group represented by —$(CH_2)_a$—$SO_3M$, —$(CH_2)_b$—COOM, —$PO_3M_2$, —$P(U)O_2M$, or —CO—$CH_2$—$CH(SO_3M)$-COOM (in the formulae, a and b each represents the number of from 0 to 4, and U represents a residue in which T is eliminated from the general formula (II)), or the like. In the formulae representing the anionic hydrophilic groups, M represents a hydrogen atom, an alkali metal atom such as lithium, sodium or potassium, an alkali earth metal atom such as magnesium or calcium, an ammonium, or an alkanol amine residue. Examples of the ammonium include ammonium of ammonia, and ammonium of an alkyl amine such as monomethylamine or dipropylamine. Examples of the alkanol amine residue include a monoethanol amine residue, a diethanol amine reside and a triethanol amine residue. Of those anionic hydrophilic groups, a group represented by —$SO_3M$, —$PO_3M_2$ or —$P(U)O_2M$ is preferred. The —$PO_3M_2$ represents a monoester with the residue U in which T is eliminated from the general formula (II), and —$P(U)O_2M$ represents a diester with the residue U in which T is eliminated from the general formula (II). Those can be each used in a single component in the present invention and can be used as a mixture in the present invention, as described above.

The proportion (Y/X) of the total amount of the polyfunctional compound (Y) used to the total amount of the reactive surfactant (X) used is preferably in a range of Y/X=1/1 to 1/100, and more preferably in a range of Y/X=1/5 to 1/50, in mass ratio.

In the general formula (II), the polymerizable unsaturated group represented by D is a 1-propenyl group, a 2-methyl-1-propenyl group or a (meth)allyl group as described above. Of those, the (meth)allyl group is introduced by a (meth)allylation reaction of phenol. On the other hand, the 1-propenyl group or the 2-methyl-1-propenyl group can be introduced by performing a (meth)allylation of phenol, and then rearranging into the 1-propenyl group or the 2-methyl-1-propenyl group in the presence of an alkali. The following method is exemplified as 1-propenyl group introduction to phenol, but the present invention is not limited to this synthesis method.

That is, a halogenated allyl is reacted with phenol together with a basic substance such as sodium hydroxide or potassium hydroxide, followed by heating to about 100° C., thereby obtaining allylphenol. At this stage, by controlling the amounts of the halogenated allyl and basic substance, the substitution number of the allyl group to phenol can be controlled and a 2-substitution product can be obtained. This reaction is described in more detail below showing general formulae. Diallylphenol is obtained according to the following reaction formulae (v) to (viii).

[Chem. 9]

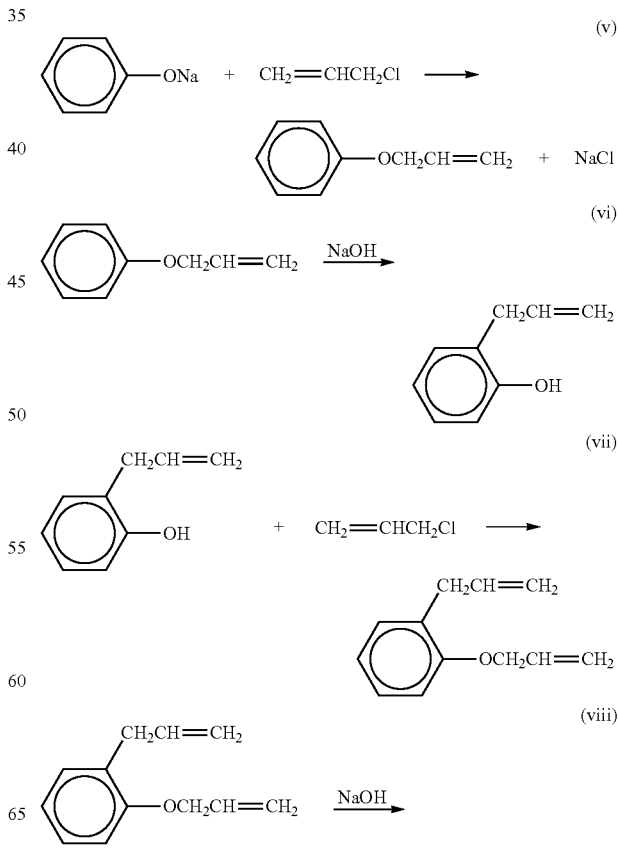

-continued

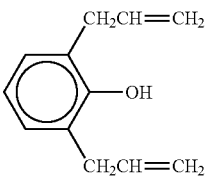

Additionally, in this case, a reaction of the following reaction formula (ix) proceeds by adjusting reaction conditions such as a feed ratio of phenol and the halogenated allyl, an amount of a catalyst and a reaction temperature, and a triallyl or the like is thereby obtained.

[Chem. 10]

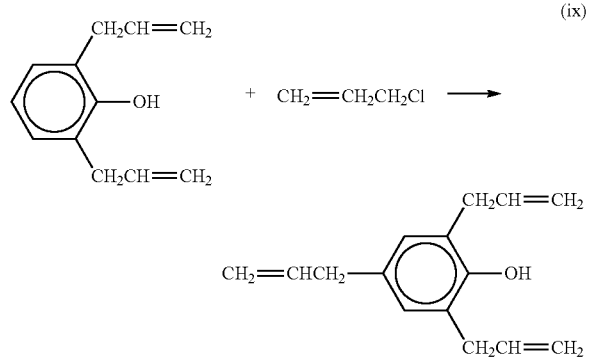

A reaction composition containing a diallyl, a triallyl and the like can be obtained by the reactions shown by the reaction formulae (v) to (ix). By heating those reaction compositions in the presence of an alkali hydroxide, an allyl group rearranges into 1-propenyl group, and propenylphenol as a main target product is obtained. Depending on reaction conditions, a composition containing a certain amount of unrearranged allylphenol can be obtained.

The subsequent steps are described below by reference to diallylphenol obtained by the reaction formula (viii). By adding a given amount of an alkylene oxide to the obtained diallylphenol according to a conventional method, a non-ionic reactive surfactant of the present invention is obtained, which is one of the target products, in which, in the general formula (II), D is 1-propenyl group, the number of substituents of a polymerizable unsaturated group represented by D is 2 and T is a hydrogen atom as described above.

When T in the general formula (II) is an anionic hydrophilic group, the compound obtained by the above method is further subjected to an introduction method of an anionic hydrophilic group. There is no limitation in reaction conditions for introducing an anionic hydrophilic group in which a in —(CH$_2$)$_a$—SO$_3$M is indicated by 0 among the formulae representing anionic hydrophilic groups, and the production can be performed, for example, by a reaction with sulfamic acid, sulfuric acid, sulfuric anhydride, fuming sulfuric acid, chlorosulfonic acid, or the like. Reaction conditions for introducing an anionic hydrophilic group in which a in —(CH$_2$)$_a$—SO$_3$M is indicated as the number of from 1 to 4 are not particularly limited, and the production can be performed, for example, by a reaction with propane sultone, butane sultone or the like.

Reaction conditions for introducing an anionic hydrophilic group represented by —(CH$_2$)$_b$—COOM among the formulae representing anionic hydrophilic groups are also not particularly limited, and the production can be performed by, for example, oxidizing a hydroxyl group or conducting a carboxylation by a reaction with a monohalogenated acetic acid, or performing a reaction with acrylonitrile or an acrylic acid ester and conducting a saponification with an alkali.

There is also no limitation in reaction conditions for introducing an anionic hydrophilic group represented by —PO$_3$M$_2$ and/or —P(U)O$_2$M (in the formula, U represents a residue in which T is eliminated from the general formula (II) among the formulae representing anionic hydrophilic groups, and the production can be performed, for example, by a reaction with diphosphorus pentoxide, polyphosphoric acid, orthophosphoric acid, phosphorus oxychloride, or the like. In the case where a phosphoric acid ester group is the anionic hydrophilic group, a monoester type compound and a diester type compound are obtained as a mixture thereof depending on the production method. Those may be separated, and may be directly used as a mixture. Furthermore, those can be used after a reaction in the presence of water to increase the proportion of the monoester compound contained.

Reaction conditions for introducing an anionic hydrophilic group represented by —CO—CH$_2$—CH(SO$_3$M)-COOM among the formulae representing anionic hydrophilic groups are also not particularly limited, and the production can be performed, for example, by conducting a monoesterification by a reaction with maleic anhydride, followed by conducting a sulfonation by a reaction with anhydrous sodium sulfite. In the case where anionic hydrophilization has been conducted, neutralization may be thereafter conducted with an alkali such as sodium hydroxide or potassium hydroxide, ammonia, an alkyl amine, an alkanol amine such as monoethanol amine or diethanol amine, or the like.

Hydrophilic group in the polyfunctional compound (Y) may be nonionic, may be anionic and may be cationic. Furthermore, those can be used by mixing in an arbitral compounding ratio.

The surfactant composition of the present invention can be used in an emulsifier for emulsion polymerization, an emulsifier for suspension polymerization, a resin modifier (water repellency improvement, hydrophilicity adjustment, compatibility improvement, antistatic property improvement, antifogging property improvement, water resistance improvement, pressure-sensitive adhesiveness improvement, dyeability improvement, film formability improvement, weather resistance improvement, antiblocking property improvement, and the like), a fiber processing aid, and the like, which are use applications in which a conventional reactive surfactants are used.

When the surfactant composition of the present invention is used as an emulsifier for emulsion polymerization, a conventional method for conducting emulsion polymerization can be used without any particular limitation, and it can be appropriately selected from a batch polymerization method, a monomer dropping method, an emulsion dropping method, a seed polymerization method, a multistage polymerization method, a power feed polymerization method and the like, which are classified on the basis of a monomer charging manner. A polymerization initiator used is not particularly limited and, for example, hydrogen peroxide, ammonium persulfate, potassium persulfate, azobisisobutyronitrile, benzoyl peroxide and the like can be used. As a polymerization promoter, use can be made of sodium bisulfite, ammonium ferrous sulfate and the like. Furthermore, as a chain transfer agent, use can be made of an α-methylstyrene dimer, mercaptans such as n-butyl mercaptan or t-dodecyl mercaptan, a halogenated hydrocarbon such as carbon tetrachloride or carbon tetrabromide, and the like.

Monomers applied to emulsion polymerization using the surfactant composition of the present invention are not particularly limited, and various kinds can be applied. For example, it can be used in the production of a (meth)acrylate emulsion, a styrene emulsion, a vinyl acetate emulsion, a halogenated olefin emulsion, a fluorine-containing polymer emulsion, an SBR (styrene/butadiene) emulsion, an ABS (acrylonitrile/butadiene/styrene) emulsion, a BR (butadiene) emulsion, an IR (isoprene) emulsion, an NBR (acrylonitrile/butadiene) emulsion, and the like. Two or more kinds of monomers can be mixed, and subjected to emulsion polymerization.

Examples of monomers constituting the (meth)acrylate emulsion include (meth)acrylic acid (esters) with each other, (meth)acrylic acid (ester)/styrene, (meth)acrylic acid (ester)/vinyl acetate, (meth)acrylic acid (ester)/acrylonitrile, (meth)acrylic acid (ester)/butadiene, (meth)acrylic acid (ester)/vinylidene chloride, (meth)acrylic acid (ester)/allylamine, (meth)acrylic acid (ester)/vinylpyridine, (meth)acrylic acid (ester)/(meth)acrylic acid alkylol amide, (meth)acrylic acid (ester)/N,N-dimethylaminoethyl(meth)acrylate and (meth)acrylic acid (ester)/N,N-diethylaminoethyl vinyl ether.

Examples of monomers of the styrene emulsion include, in addition to styrene alone, styrene/acrylonitrile, styrene/butadiene, styrene/fumaric nitrile, styrene/maleic nitrile, styrene/cyanoacrylic acid ester, styrene/vinyl phenyl acetate, styrene/chloromethyl styrene, styrene/dichlorostyrene, styrene/vinyl carbazole, styrene/N,N-diphenyl acrylamide, styrene/methyl styrene, acrylonitrile/butadiene/styrene, styrene/acrylonitrile/methyl styrene, styrene/acrylonitrile/vinyl carbazole, and styrene/maleic acid.

Examples of monomers of the vinyl acetate emulsion include, in addition to vinyl acetate alone, vinyl acetate/styrene, vinyl acetate/vinyl chloride, vinyl acetate/acrylonitrile, vinyl acetate/maleic acid (ester), vinyl acetate/fumaric acid (ester), vinyl acetate/ethylene, vinyl acetate/propylene, vinyl acetate/isobutylene, vinyl acetate/vinylidene chloride, vinyl acetate/cyclopentadiene, vinyl acetate/crotonic acid, vinyl acetate/acrolein, vinyl acetate/alkyl vinyl ether, VeoVa9 (manufactured by MOMENTIVE, neononanoic acid vinyl ester), and VeoVa10 (manufactured by MOMENTIVE, neodecanoic acid vinyl ester).

Examples of monomers applied to the polymerization of a halogenated olefin include vinyl chloride, vinylidene chloride, vinyl chloride/maleic acid (ester), vinyl chloride/fumaric acid (ester), vinyl chloride/vinyl acetate, vinyl chloride/vinylidene chloride, vinylidene chloride/vinyl acetate, and vinylidene chloride/vinyl benzoate.

Examples of the fluorine-containing monomer include tetrafluoroethylene, hexafluoropropylene, chlorotrifluoroethylene, vinyl fluoride, vinylidene fluoride, trifluoroethylene, hexafluoroisobutylene, perfluorobutylethylene, 2-(perfluorobutyl)ethyl acrylate, 2-(perfluorohexyl)ethyl acrylate, 2-(perfluorobutyl)ethyl methacrylate, and 2-(perfluorohexyl)ethyl methacrylate.

Of those monomers, one kind alone may be used and two or more kinds may be used. When the present description describes the monomers as "A/B" and the like as above, it indicates a combination use of the set of monomers linked with "/".

With the intention of improvement of polymerization stability in emulsion polymerization, improvement of miscibility of pigments and fillers in post-steps, improvement of wettability to a substrate, and the like, one kind or two or more kinds of general surfactants having no polymerizable group of radically polymerizable can be concurrently used in a range that does not adversely affect the problems to be solved in the present invention.

The surfactant concurrently used is not particularly limited. Examples of a nonionic surfactant include a polyoxyalkylene alkyl phenyl ether, a polyoxyalkylene alkyl ether, a polyoxyalkylene styrenated phenyl ether, a polyoxyalkylene benzylated phenyl ether, a polyoxyalkylene cumyl phenyl ether, a fatty acid polyethylene glycol ether, a polyoxyalkylene sorbitan fatty acid ester, and a sorbitan fatty acid ester. Examples of an anionic surfactant include a fatty acid soap, a rosin acid soap, an alkyl sulfonic acid salt, an alkyl arylsulfonic acid salt, an alkyl sulfuric acid ester salt, and an alkyl sulfosuccinic acid salt. Other than those, a sulfuric acid ester salt, a phosphoric acid ester salt, an ether carboxylic acid salt, a sulfosuccinic acid salt, and the like of the above-described nonionic surfactants having a polyoxyalkylene chain can also be preferably used. Examples of a cationic surfactant include a stearyl trimethylammonium salt, a cetyl trimethylammonium salt, a lauryl trimethylammonium salt, a dialkyl dimethylammonium salt, an alkyl dimethyl benzylammonium salt, and an alkyl dimethyl hydroxyethylammonium salt.

For the purpose of improving polymerization stability in emulsion polymerization, a conventional protective colloid agent can be concurrently used. Examples of the protective colloid agent that can be concurrently used include completely saponified polyvinyl alcohol (PVA), partially saponified PVA, hydroxyethyl cellulose, carboxymethyl cellulose, methyl cellulose, polyacrylic acid, and polyvinyl pyrrolidone.

Kind and addition amount of the polymerization initiator are not particularly limited. Persulfates such as ammonium persulfate and potassium persulfate are desirable, and peroxides such as hydrogen peroxide and benzoyl peroxide can be used. As necessary, a combination of persulfates with a reducing agent such as a sulfite, bisulfite or the like of an alkali metal can be used as a Redox polymerization initiator that can initiate a polymerization reaction at low temperature.

As necessary, a molecular weight modifier used in an emulsion polymerization process can be appropriately used in a range that does not adversely affect the problems to be solved in the present invention. As the molecular weight modifier, use can be made of mercaptans such as n-dodecyl mercaptan, octyl mercaptan, t-butyl mercaptan, thioglycolic acid, thiomalic acid or thiosalicylic acid; sulfides such as diisopropylxanthogen disulfide, diethylxanthogen disulfide or diethylthiuram disulfide; halogenated hydrocarbons such as iodoform; diphenylethylene; p-chlorodiphenylethylene; p-cyanodiphenylethylene; α-methylstyrene dimer; or the like.

When the surfactant composition of the present invention is used as an emulsifier for emulsion polymerization as described above, a polymer dispersion obtained is used for formation of a coating film as a coating material or a pressure-sensitive adhesive or for recovery of a solid polymer by a precipitant according to a conventional manner. That is, a polymer film is obtained by drying the polymer dispersion obtained at ordinary temperatures, or as necessary, under heating. Furthermore, the solid polymer can be recovered by adding an acid or salt conventionally used as a precipitant, followed by stirring to flocculate the polymer, and performing filtration or the like.

The surfactant composition of the present invention can be widely used in a dispersant for suspension polymerization, a non-aqueous dispersant, a resin modifier and the like, in addition to the use as an emulsifier for emulsion polymerization as described above. In this case, an application item, a use method, a use amount and the like are not particularly limited, and are determined according to a conventional technique.

EXAMPLES

The present invention is described in more detail below by reference to examples, but it should be understood that the present invention is not limited by those examples. Unless otherwise indicated, the proportion such as "%" in the description is mass basis. In structural formulae, EO represents an oxyethylene group and PO represents an oxypropylene group.

1. Reactive Surfactant (X)

Reactive surfactants (X) used in the Examples were synthesized under the following conditions.

Synthesis Example 1 of Reactive Surfactant

In a reaction vessel equipped with a stirrer, a thermometer and a reflux pipe were charged 230 g (1.0 mole) of styrenated phenol (a mixture of monostyrenated phenol:distyrenated phenol:tristyrenated phenol=72:27:1), 40 g (1.0 mole) of NaOH and 210 g of acetone and an inner temperature was increased to 40° C. while stirring. Then, 76 g (1.0 mole) of allyl chloride was added thereto dropwise over 1 hour. After completion of the dropwise addition, they were further reacted while holding at 40° C. for 2 hours. The resulting reaction product was subjected to filtration to remove NaCl by-produced, and acetone was then removed under reduced pressure. Thus, 314 g of allyl styrenated phenyl ether was obtained. The allyl styrenated phenyl ether was charged in an autoclave and maintained therein at 200° C. for 5 hours while stirring. Rearrangement reaction occurred at this stage, and styrenated allylphenol was formed. To an autoclave was transferred 290 g of the styrenated allylphenol and 2,200 g (50 moles) of ethylene oxide was added thereto under the conditions of pressure of 1.5 kg/cm² and temperature of 130° C. by using potassium hydroxide as a catalyst. Thus, a reactive surfactant [I] represented by the following structural formula was obtained.

[Chem. 11]

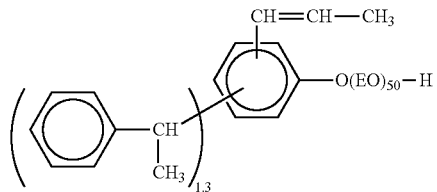

Synthesis Example 2 of Reactive Surfactant

An intermediate A was obtained by conducting the reaction according to Synthesis Example 1 of Reactive Surfactant, except for increasing the amount of allyl chloride from 76 g (1.0 mole) to 91 g (1.2 moles) and decreasing the amount of ethylene oxide from 2200 g (50 moles) to 440 g (10 moles). Then, 730 g (1 mole) of the intermediate A was charged in a reaction vessel equipped with a stirrer, a thermometer and a reflux pipe, an atmosphere in the reaction apparatus was substituted with nitrogen, and 97 g (1 mole) of sulfamic acid was then reacted thereto under the condition of temperature of 110° C., followed by purification. Thus, a reactive surfactant [2] represented by the following structural formula was obtained.

[Chem. 12]

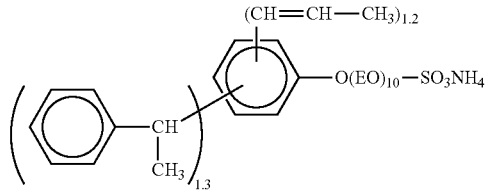

Synthesis Example 3 of Reactive Surfactant

In a reaction vessel equipped with a stirrer, a thermometer and a reflux pipe were charged 730 g (1 mole) of the intermediate A and 94 g (0.33 moles) of phosphoric anhydride and phosphorylation was conducted at 80° C. for 5 hours while stirring, followed by neutralization with sodium hydroxide. Thus, a reactive surfactant [3] that is a mixture of a monoester and a diester, represented by the following structural formulae was obtained. The resulting composition was confirmed with NMR. As a result, a ratio of monoester/diester was 51/49.

[Chem. 13]

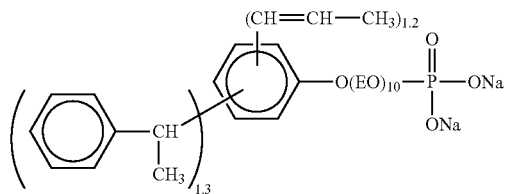

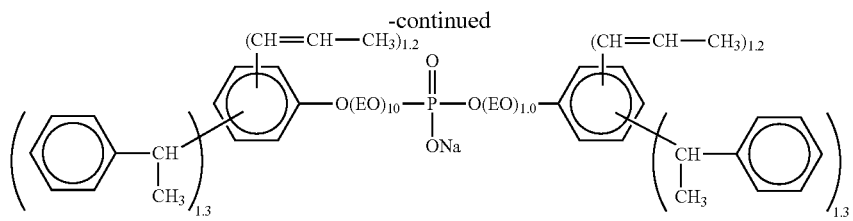

Synthesis Example 4 of Reactive Surfactant

In a reaction vessel equipped with a stirrer, a thermometer and a reflux pipe was charged 730 g (1 mole) of the intermediate A. Then, to the reaction vessel heated to 40° C. were added 128 g (1.1 moles) of sodium monochloroacetate and 44 g (1.1 moles) of sodium hydroxide over 3 hours while stirring. Thereafter, reaction was conducted at 40° C. for 17 hours while stirring, followed by purification. Thus, a reactive surfactant [4] represented by the following structural formula was obtained.

[Chem. 14]

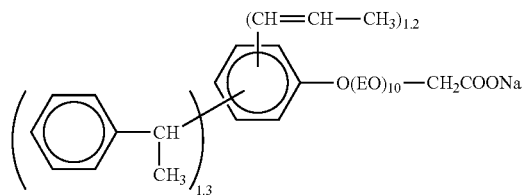

Synthesis Example 5 of Reactive Surfactant

A reactive surfactant [5] represented by the following structural formula was obtained by conducting the reaction according to the reactive surfactant [2], except for adding 175 g (3 moles) of propylene oxide before adding 440 g (10 moles) of ethylene oxide.

[Chem. 15]

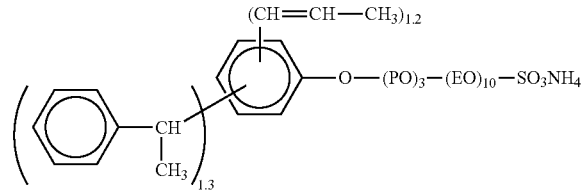

2. Polyfunctional Compound (Y)

Polyfunctional compounds synthesized under the following conditions were used in experiments.

Synthesis Example 1 of Polyfunctional Compound

In a reaction vessel equipped with a stirrer, a thermometer and a reflux pipe were charged 94 g (1.0 mole) of phenol, 40 g (1.0 mole) of NaOH and 210 g of acetone and an inner temperature was increased to 40° C. while stirring. Then, 152 g (2.0 moles) of allyl chloride was added thereto dropwise over 1 hour. After completion of the dropwise addition, they were further reacted while holding at 40° C. for 2 hours. The resulting reaction product was subjected to filtration to remove NaCl by-produced, and acetone was then removed under reduced pressure. Thus, 134 g of allyl phenyl ether was obtained. The allyl phenyl ether was charged in an autoclave and maintained therein at 200° C. for 5 hours while stirring. Rearrangement reaction occurred at this stage to form 2-allyl phenol. To an autoclave was transferred 134 g of the 2-allyl phenol and 44 g (1 mole) of ethylene oxide was added thereto under the conditions of pressure of 1.5 kg/cm² and temperature of 130° C. by using potassium hydroxide as a catalyst. Thus, a polyfunctional compound [I] represented by the following structural formula was obtained.

[Chem. 16]

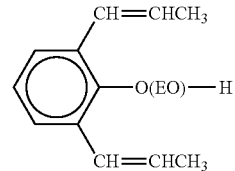

Synthesis Example 2 of Polyfunctional Compound

A polyfunctional compound [2] represented by the following structural formula was obtained according to Synthesis Example 1 of Polyfunctional Compound, except for increasing the amount of ethylene oxide from 44 g (1 mole) to 440 g (10 moles).

[Chem. 17]

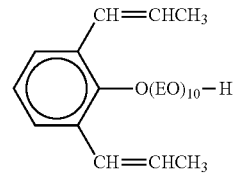

Synthesis Example 3 of Polyfunctional Compound

A polyfunctional compound [3] represented by the following structural formula was obtained according to Synthesis Example 1 of Polyfunctional Compound, except for increasing the amount of ethylene oxide from 44 g (1 mole) to 2,200 g (50 moles).

[Chem. 18]

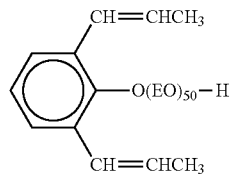

Synthesis Example 4 of Polyfunctional Compound

In a reaction vessel equipped with a stirrer, a thermometer and a reflux pipe was charged 614 g (1 mole) of the polyfunctional compound [2] obtained in Synthesis Example 2 of Polyfunctional Compound, an atmosphere in the reaction apparatus was substituted with nitrogen, and 97 g (1 mole) of sulfamic acid was then reacted thereto under the condition of temperature of 110° C., followed by purification. Thus, a polyfunctional compound [4] represented by the following structural formula was obtained.

[Chem. 19]

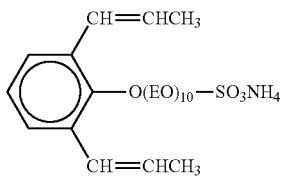

Synthesis Example 5 of Polyfunctional Compound

A polyfunctional compound [5] represented by the following structural formula was obtained according to Synthesis Example 4 of Polyfunctional Compound, except for increasing the amount of allyl chloride from 152 g (2 moles) to 228 g (3 moles)

[Chem. 20]

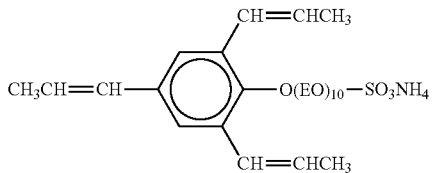

Synthesis Example 6 of Polyfunctional Compound

In a reaction vessel equipped with a stirrer, a thermometer and a reflux pipe was charged 614 g (1 mole) of the polyfunctional compound [2] obtained in Synthesis Example 2 of Polyfunctional Compound. While stirring this, 94 g (0.33 moles) of phosphoric anhydride was charged thereto and phosphorylation was conducted at 80° C. for 5 hours while stirring, followed by neutralization with sodium hydroxide. Thus, a polyfunctional compound [6] represented by the following structural formula was obtained. The resulting composition was confirmed with NMR. As a result, a ratio of monoester/diester was 51/49.

[Chem. 21]

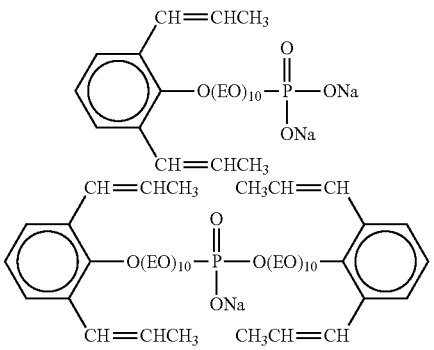

Synthesis Example 7 of Polyfunctional Compound

A reactive surfactant [7] represented by the following structural formula was obtained by conducting the reaction according to the polyfunctional compound [4], except for adding 175 g (3 moles) of propylene oxide before adding 440 g (10 moles) of ethylene oxide.

[Chem. 22]

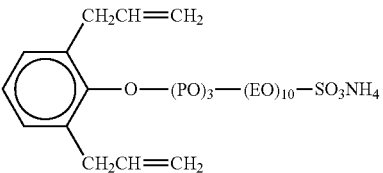

3. Preparation of Polymer Dispersion (Use Example 1) Preparation of Styrene/Butyl Acrylate Polymer Dispersion As monomers, 123.75 g of styrene, 123.75 g of butyl acrylate and 2.5 g of acrylic acid were mixed with a reactive surfactant and a polyfunctional compound in amounts shown in Table 1 and 105 g of ion-exchanged water by a homomixer to prepare a mixed monomer emulsion. Separately, 122 g of ion-exchanged water and 0.25 g of sodium hydrogen carbonate were charged in a reactor equipped with a stirrer, a reflux condenser, a thermometer, a nitrogen introduction pipe, and a dropping funnel. In the dropping funnel was charged 36 g of the mixed monomer emulsion prepared as above in advance, and was added en bloc to the reactor, and a temperature was increased to 80° C. After continuing stirring for 15 minutes, 0.5 g of ammonium persulfate as a polymerization initiator dissolved in 20 g of ion-exchanged water was added to initiate polymerization. The remaining 324 g of the mixed monomer emulsion was added dropwise thereto over 3 hours after 15 minutes from the addition of the polymerization initiator to perform polymerization. After aging 2 hours, cooling was performed and pH was adjusted to 8 with ammonia water. Thus, a polymer dispersion for evaluation experiment of the present invention was obtained.

(Use Example 2) Preparation of 2-Ethylhexyl Acrylate/Butyl Acrylate Polymer Dispersion A polymer dispersion used for evaluation experiment of the present invention was obtained by conducting emulsion polymerization in the same operation as in Use Example 1, except for changing styrene in the monomer components to 2-ethylhexyl acrylate in Use Example 1.

4. Evaluation Test of Polymer Dispersion and Polymer Film Thereof

Polymer dispersions obtained in each Example and Comparative Example of the above Use Example 1 and Use Example 2 and their polymer films were subjected to the following evaluation tests. The results of Use Example 1 are shown in Table 1 and the results of Use Example 2 are shown in Table 2.

(1) Evaluation of Polymer Dispersion
[Polymerization Stability]

Aggregates formed during the emulsion polymerization process of a polymer dispersion were filtered by an 80 mesh wire net, and filtration residue was washed with water and then dried at 105° C. for 2 hours. The mass was indicated by the proportion (wt %) to solid content of the dispersion. In the measurement, smaller amount of aggregates means high polymerization stability in the emulsion polymerization process.

[Average Particle Diameter]

A part of a polymer dispersion was sampled, and a particle diameter thereof was measured with a dynamic light-scattering particle size distribution analyzer (manufactured by Nikkiso Co., Ltd., trade name MICROTRAC UPA9340).

[Mechanical Stability]

From a polymer dispersion, 50 g was weighed and processed under a load of 10 kg in the number of revolutions of 1,000 rpm for 5 minutes with a Maron type tester. Aggregates formed were filtered with a 80 mesh wire net, and a residue was washed with water and dried at 105° C. for 2 hours. The mass was indicated by the proportion (wt %) to solid content of the dispersion. In the measurement, smaller amount of aggregates means high stability of the polymer dispersion in high shear condition.

[Defoamability]

In a 100 ml Nessler tube was put 30 ml of a polymer dispersion which had been diluted two fold with water, followed by inverting 30 times and allowing to stand, and an amount (ml) of foams after 5 minutes was measured.

[Copolymerization Rate of Reactive Surfactant]

A certain amount of a polymer dispersion was weighed and an excessive methanol was added thereto. The methanol-diluted solution was subjected to a centrifugal separation treatment to separate into a polymer and a supernatant. The supernatant was then recovered, followed by vacuum distillation to obtain a residue. From HPLC measurement thereof, a copolymerization rate of a reactive surfactant was measured.

(2) Evaluation of Polymer Film
[Water Whitening Resistance]

A polymer dispersion obtained was applied on a commercially available glass plate in a film thickness of 120 μm (dry), followed by drying in an atmosphere of 20° C.×65% RH for 24 hours. This was dipped in ion-exchanged water of 60° C. The glass plate was placed on printed characters of 12 points. The characters were seen through the polymer film and days until the characters become invisible were measured. The results are evaluated based on the following criteria.

⊙: 10 days or more
◯: 5 days or more and less than 10 days
Δ: 1 day or more and less than 5 days
x: less than 1 day

[Water Absorption Rate] (Only Use Example 1)

A polymer dispersion obtained was applied on a commercially available glass plate in a film thickness of 120 μm (dry), followed by drying in an atmosphere of 20° C.×65% RH for 24 hours. The polymer film was carefully peeled from the glass plate. The polymer film was cut into a size of 5 cm×5 cm and mass (initial mass) of the polymer film was measured. This was then dipped in ion-exchanged water of 60° C. and 48 hours later, the polymer film was taken out of water. Water on the surface was lightly wiped out with a clean filter paper and mass (mass after dipping) of the polymer film was then measured. Water absorption rate of the film was obtained from the following calculation formula.

Water absorption rate (wt %)={(mass of polymer film after dipping−initial mass of polymer film)/ initial mass of polymer film}×100

[Water-Resistant Pressure-Sensitive Adhesion Retention Forth] (Only Use Example 2)

The polymer dispersion obtained in Use Example 2 was applied, in a thickness of 25 μm (dry), on a PET film cut into a width of 5 cm and heated, followed by sticking to SUS plate and press-contacting with rollers. After allowing to stand in the environment of 20° C. and 60% RH for 24 hours, the resultant was dipped in ion-exchanged water in the environment of 25° C. for 24 hours and then taken out thereof. The film was then peeled such that an adhesion surface is 5 cm×5 cm. At an end of the film, 200 g of a weight was hung and the time (second) until the weight falls down was measured. The results were evaluated on the basis of the following criteria.

⊙: 360 seconds or more
◯: 300 seconds or more and less than 360 seconds
Δ: 240 seconds or more and less than 300 seconds
x: less than 240 second

TABLE 1

| Formulation/composition | Examples | | | | | | | | |
|---|---|---|---|---|---|---|---|---|---|
| (charging unit, g) | 1-1 | 1-2 | 1-3 | 1-4 | 1-5 | 1-6 | 1-7 | 1-8 | 1-9 |
| [Reactive surfactant] | | | | | | | | | |
| Reactive surfactant [1] | 4.7 | | | | | | | | |
| Reactive surfactant [2] | | 4.7 | 4.7 | 4.7 | 4.7 | | | 4.9 | 4.7 |
| Reactive surfactant [3] | | | | | | 4.7 | | | |
| Reactive surfactant [4] | | | | | | | 4.7 | | |
| Reactive surfactant [5] | | | | | | | | | |
| Comparative surfactant* | | | | | | | | | |

TABLE 1-continued

[Polyfunctional compound]

| Polyfunctional compound | C1 | C2 | C3 | C4 | C5 | C6 | C7 | C8 | C9 |
|---|---|---|---|---|---|---|---|---|---|
| Polyfunctional compound [1] |  | 0.3 |  |  |  |  |  |  |  |
| Polyfunctional compound [2] |  |  | 0.3 |  |  |  | 0.3 |  | 0.1 |
| Polyfunctional compound [3] | 0.3 |  |  |  |  |  |  |  |  |
| Polyfunctional compound [4] |  |  |  | 0.3 |  |  |  | 0.1 | 0.2 |
| Polyfunctional compound [5] |  |  |  |  | 0.3 |  |  |  |  |
| Polyfunctional compound [6] |  |  |  |  |  | 0.3 |  |  |  |
| Polyfunctional compound [7] |  |  |  |  |  |  |  |  |  |

[Evaluation item]

| | | C1 | C2 | C3 | C4 | C5 | C6 | C7 | C8 | C9 |
|---|---|---|---|---|---|---|---|---|---|---|
| Polymer dispersion | Polymerization stability, wt % | 0.01 | <0.01 | <0.01 | 0.03 | 0.02 | 0.02 | <0.01 | 0.02 | 0.01 |
| | Average particle diameter, nm | 165 | 166 | 170 | 167 | 167 | 168 | 168 | 165 | 166 |
| | Mechanical stability, wt % | 5.30 | 4.97 | 4.85 | 5.92 | 5.04 | 4.77 | 4.58 | 5.26 | 4.69 |
| | Defoamability, ml | 3 | 3 | 4 | 3 | 5 | 3 | 4 | 5 | 4 |
| | Copolymerization rate of reactive surfactant, % | 77 | 79 | 80 | 78 | 78 | 77 | 79 | 75 | 79 |
| Polymer film | Water whitening resistance | ⊙ | ⊙ | ⊙ | ⊙ | ⊙ | ⊙ | ⊙ | ⊙ | ⊙ |
| | Water absorption rate, wt % | 10.4 | 10.0 | 10.6 | 9.6 | 11.0 | 9.8 | 10.2 | 10.8 | 10.1 |

| Formulation/composition | Examples | | Comparative Examples | | | | | | |
|---|---|---|---|---|---|---|---|---|---|
| (charging unit, g) | 1-10 | 1-11 | 1-1 | 1-2 | 1-3 | 1-4 | 1-5 | 1-6 | 1-7 |

[Reactive surfactant]

| | 1-10 | 1-11 | 1-1 | 1-2 | 1-3 | 1-4 | 1-5 | 1-6 | 1-7 |
|---|---|---|---|---|---|---|---|---|---|
| Reactive surfactant [1] |  |  | 5.0 |  |  |  |  |  |  |
| Reactive surfactant [2] | 3.0 |  |  | 5.0 |  |  |  |  |  |
| Reactive surfactant [3] |  |  |  |  | 5.0 |  |  |  |  |
| Reactive surfactant [4] |  |  |  |  |  | 5.0 |  |  |  |
| Reactive surfactant [5] |  | 4.7 |  |  |  |  |  |  |  |
| Comparative surfactant* |  |  |  |  |  |  |  | 5.0 |  |

[Polyfunctional compound]

| | 1-10 | 1-11 | 1-1 | 1-2 | 1-3 | 1-4 | 1-5 | 1-6 | 1-7 |
|---|---|---|---|---|---|---|---|---|---|
| Polyfunctional compound [1] |  |  |  |  |  |  |  |  |  |
| Polyfunctional compound [2] |  |  |  |  |  |  |  |  |  |
| Polyfunctional compound [3] |  |  |  |  |  |  |  |  |  |
| Polyfunctional compound [4] | 2.0 |  |  |  |  |  |  |  | 5.0 |
| Polyfunctional compound [5] |  |  |  |  |  |  |  |  |  |
| Polyfunctional compound [6] |  |  |  |  |  |  |  |  |  |
| Polyfunctional compound [7] |  | 0.3 |  |  |  |  |  |  |  |

[Evaluation item]

| | | 1-10 | 1-11 | 1-1 | 1-2 | 1-3 | 1-4 | 1-5 | 1-6 | 1-7 |
|---|---|---|---|---|---|---|---|---|---|---|
| Polymer dispersion | Polymerization stability, wt % | 0.03 | 0.02 | 0.01 | 0.04 | 0.03 | 0.01 | 0.02 | 0.03 | 0.68 |
| | Average particle diameter, nm | 168 | 167 | 166 | 169 | 165 | 168 | 168 | 166 | 430 |
| | Mechanical stability, wt % | 5.39 | 5.30 | 5.94 | 5.72 | 5.54 | 5.78 | 5.61 | 6.30 | 12.0 |
| | Defoamability, ml | 3 | 4 | 7 | 9 | 6 | 8 | 7 | 15 | 3 |
| | Copolymerization rate of reactive surfactant, % | 78 | 77 | 77 | 75 | 76 | 74 | 75 | — | 75 |
| Polymer film | Water whitening resistance | ○ | ⊙ | Δ | Δ | Δ | Δ | Δ | X | X |
| | Water absorption rate, wt % | 15.3 | 11.0 | 41.5 | 35.8 | 40.5 | 41.0 | 35.5 | 50.0 | 50.0 |

*Polyoxyethylene styrenated phenyl ether sulfuric acid ester salt (manufactured by DKS Co. Ltd., HITENOL NF-13)

TABLE 2

| Formulation/composition (charging unit, g) | | 2-1 | 2-2 | 2-3 | 2-4 | 2-5 | 2-6 | 2-7 | 2-8 | 2-9 | 2-10 |
|---|---|---|---|---|---|---|---|---|---|---|---|
| [Reactive surfactant] | | | | | | | | | | | |
| Reactive surfactant [1] | | 4.7 | | | | | | | | 4.9 | 4.0 |
| Reactive surfactant [2] | | | 4.7 | 4.7 | 4.7 | 4.7 | | | | | |
| Reactive surfactant [3] | | | | | | | 4.7 | | | | |
| Reactive surfactant [4] | | | | | | | | 4.7 | | | |
| Comparative surfactant* | | | | | | | | | | | |
| [Polyfunctional compound] | | | | | | | | | | | |
| Polyfunctional compound [1] | | | 0.3 | | | | | | | | |
| Polyfunctional compound [2] | | | | 0.3 | | | | | 0.3 | | |
| Polyfunctional compound [3] | | 0.3 | | | | | | | | | |
| Polyfunctional compound [4] | | | | | 0.3 | | | | 0.1 | 0.1 | |
| Polyfunctional compound [5] | | | | | | 0.3 | | | | 0.2 | |
| Polyfunctional compound [6] | | | | | | | 0.3 | | | | 1.0 |
| [Evaluation item] | | | | | | | | | | | |
| Polymer dispersion | Polymerization stability, wt % | 0.01 | <0.01 | 0.02 | 0.02 | <0.01 | 0.03 | 0.01 | 0.03 | 0.02 | 0.01 |
| | Average particle diameter, nm | 157 | 156 | 157 | 159 | 160 | 156 | 158 | 157 | 155 | 158 |
| | Mechanical stability, wt % | 0.32 | 0.30 | 0.24 | 0.28 | 0.20 | 0.35 | 0.29 | 0.23 | 0.21 | 0.27 |
| | Defoamability, ml | 9 | 8 | 8 | 10 | 9 | 8 | 8 | 9 | 8 | 8 |
| | Copolymerization rate of reactive surfactant, % | 98 | 99 | 97 | 99 | 97 | 98 | 97 | 98 | 97 | 96 |
| Polymer film | Water whitening resistance | ⊙ | ⊙ | ⊙ | ⊙ | ⊙ | ⊙ | ⊙ | ⊙ | ⊙ | ○ |
| | Water-resistant pressure-sensitive adhesion retention forth | ⊙ | ⊙ | ⊙ | ⊙ | ⊙ | ⊙ | ⊙ | ⊙ | ⊙ | ○ |

| Formulation/composition (charging unit, g) | | 2-1 | 2-1 | 2-3 | 2-4 | 2-5 | 2-6 | 2-7 |
|---|---|---|---|---|---|---|---|---|
| [Reactive surfactant] | | | | | | | | |
| Reactive surfactant [1] | | 5.0 | | | | | | |
| Reactive surfactant [2] | | | 5.0 | | | | | |
| Reactive surfactant [3] | | | | 5.0 | | | | |
| Reactive surfactant [4] | | | | | 5.0 | | | |
| Comparative surfactant* | | | | | | 5.0 | | 5.0 |
| [Polyfunctional compound] | | | | | | | | |
| Polyfunctional compound [1] | | | | | | | | |
| Polyfunctional compound [2] | | | | | | | | |
| Polyfunctional compound [3] | | | | | | | | |
| Polyfunctional compound [4] | | | | | | | | 5.0 |
| Polyfunctional compound [5] | | | | | | | | |
| Polyfunctional compound [6] | | | | | | | | |
| [Evaluation item] | | | | | | | | |
| Polymer dispersion | Polymerization stability, wt % | 0.02 | 0.03 | 0.01 | 0.03 | 0.02 | 0.02 | 0.54 |
| | Average particle diameter, nm | 157 | 159 | 160 | 156 | 157 | 158 | 340 |
| | Mechanical stability, wt % | 0.26 | 0.29 | 0.31 | 0.33 | 0.28 | 0.55 | 5.80 |
| | Defoamability, ml | 11 | 15 | 13 | 12 | 15 | 22 | 10 |
| | Copolymerization rate of reactive surfactant, % | 95 | 96 | 97 | 95 | 95 | — | 95 |
| Polymer film | Water whitening resistance | Δ | Δ | Δ | Δ | Δ | X | X |
| | Water-resistant pressure-sensitive adhesion retention forth | Δ | Δ | Δ | Δ | Δ | X | X |

*Polyoxyethylene styrenated phenyl ether sulfuric acid ester salt (manufactured by DKS Co. Ltd., HITENOL NF-13)

It is seen from the results shown in Tables 1 and 2 that in each example concurrently using the reactive surfactant (X) and the polyfunctional compound (Y), a polymer dispersion having excellent deformability and high polymerization stability and mechanical stability is obtained, and a polymer film obtained from the polymer dispersion is excellent in water resistance.

The invention claimed is:

1. A reactive surfactant composition comprising one kind or two or more kinds of reactive surfactants (X) represented by a following general formula (I) and one kind or two or more kinds of polyfunctional compounds (Y) represented by a following general formula (II):

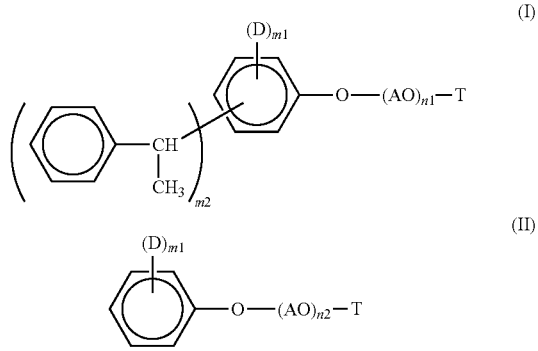

wherein in the general formula (I) and the general formula (II), D represents a polymerizable unsaturated group represented by either of following chemical formulae D-1 and D-2 wherein $R^1$ represents a hydrogen atom or a methyl group; A represents an alkylene group or a substituted alkylene group having from 2 to 4 carbon atoms, n1 and n2 each represents an addition mole number in a range of from 0 to 1,000; T represents a hydrogen atom or an anionic hydrophilic group selected from $-(CH_2)_a-SO_3M$, $-PO_3M_2$, $-P(U)O_2M$, and $-CO-CH_2-CH(SO_3M)$-COOM, wherein a and b each represents a number of from 0 to 4, U represents a residue wherein T is eliminated from the general formula (I) or general formula (II), and M independently represents a hydrogen atom, an alkali metal atom, an alkali earth metal atom, an ammonium residue, or an alkanol amine residue; in the general formula (I), m1 represents a number of substituents in a range of from 1 to 2, and m2 represents a number of substituents in a range of from 1 to 3; and in the general formula (II), m3 represents a number of substituents in a range of from 2 to 3:

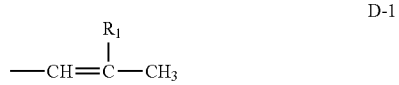

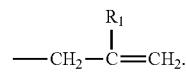

2. The surfactant composition according to claim 1, wherein when D-2 is present the value of (D-1)/(D-2) is larger than 2, which is a molar ratio between the polymerizable unsaturated group represented by the chemical formula D-1 and the polymerizable unsaturated group represented by the chemical formula D-2 that are contained in the reactive surfactant (X) represented by the general formula (I) and the polyfunctional compound (Y) represented by the general formula (II).

3. The surfactant composition according to claim 2, wherein when D-2 is present the value of (D-1)/(D-2) is larger than 2, which is a molar ratio between the polymerizable unsaturated group represented by the chemical formula D-1 and the polymerizable unsaturated group represented by the chemical formula D-2 that are contained in the reactive surfactant (X) represented by the general formula (I); and when D-2 is present the value of (D-1)/(D-2) is larger than 2, which is a molar ratio between the polymerizable unsaturated group represented by the chemical formula D-1 and the polymerizable unsaturated group represented by the chemical formula D-2 that are contained in the polyfunctional compound (Y) represented by the general formula (II).

4. The surfactant composition according to claim 1, wherein a ratio (Y/X) of a total amount of the polyfunctional compound (Y) used to a total amount of the reactive surfactant (X) used falls within a range of Y/X=1/1 to 1/100 in mass ratio.

5. An emulsifier for emulsion polymerization, comprising the surfactant composition according to claim 1.

6. A dispersant for suspension polymerization, comprising the surfactant composition according to claim 1.

7. A nonaqueous dispersant, comprising the surfactant composition according to claim 1.

8. A resin modifier, comprising the surfactant composition according to claim 1.

9. The surfactant composition according to claim 2, wherein a ratio (Y/X) of a total amount of the polyfunctional compound (Y) used to a total amount of the reactive surfactant (X) used falls within a range of Y/X=1/1 to 1/100 in mass ratio.

10. The surfactant composition according to claim 3, wherein a ratio (Y/X) of a total amount of the polyfunctional compound (Y) used to a total amount of the reactive surfactant (X) used falls within a range of Y/X=1/1 to 1/100 in mass ratio.

* * * * *